United States Patent
Hessler et al.

(10) Patent No.: US 9,628,151 B2
(45) Date of Patent: Apr. 18, 2017

(54) SELECTION OF ACCESS POINTS FOR COORDINATED MULTIPOINT UPLINK RECEPTION

(71) Applicant: TELEFONAKTIEBOLAGET L M ERICSSON (PUBL), Stockholm (SE)

(72) Inventors: Martin Hessler, Linköping (SE); Anders Furuskär, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 14 days.

(21) Appl. No.: 14/436,117

(22) PCT Filed: Oct. 17, 2012

(86) PCT No.: PCT/SE2012/051112
§ 371 (c)(1),
(2) Date: Apr. 16, 2015

(87) PCT Pub. No.: WO2014/062104
PCT Pub. Date: Apr. 24, 2014

(65) Prior Publication Data
US 2015/0270877 A1 Sep. 24, 2015

(51) Int. Cl.
*H04B 7/02* (2006.01)
*H04B 7/024* (2017.01)
(Continued)

(52) U.S. Cl.
CPC .......... *H04B 7/024* (2013.01); *H04B 17/364* (2015.01); *H04W 48/20* (2013.01); *H04W 36/0061* (2013.01); *H04W 36/0083* (2013.01)

(58) Field of Classification Search
CPC .. H04B 7/022–7/026; H04W 36/0061; H04W 36/0083; H04W 48/20
See application file for complete search history.

(56) References Cited

U.S. PATENT DOCUMENTS

2011/0044272 A1* 2/2011 Cui .................... H04B 7/0452
370/329
2011/0080879 A1 4/2011 Grant
(Continued)

FOREIGN PATENT DOCUMENTS

WO 2011/150262 A1 12/2011

OTHER PUBLICATIONS

Nortel; "Updates on Cell Clustering for CoMP Transmission/Reception," 3GPP Draft; 3rd Generation Partnership Project, Mobile Competence Centre; 650, Route des Lucioles, France; Apr. 28, 2009; San Francisco, USA.
(Continued)

*Primary Examiner* — Pao Sinkantarakorn

(57) ABSTRACT

The proposed technology involves a mechanism for selecting, for a user, access points for coordinated multipoint (COMP) uplink reception. The method comprises obtaining, for each of a number of candidate access points, at least one uplink measurement result. The method also involves combining candidate access points to form at least two different sets of access points from the candidate access points. The method comprises estimating, for each one of the at least two different sets of access points, an uplink quality measure based on the uplink measurement results of the considered set of access points, and determining, for each one of the at least two different sets of access points, a measure representative of the number of transmission opportunities available to the user for the considered set of access points over a given period of time. The method also comprises selecting which one of the at least two different sets of access points to use for COMP uplink reception based on the uplink quality measure and the measure representative of the number of transmission opportunities available to the user over the given period of time.

14 Claims, 12 Drawing Sheets

(51) Int. Cl.
*H04B 17/364* (2015.01)
*H04W 48/20* (2009.01)
*H04W 36/00* (2009.01)

(56) References Cited

U.S. PATENT DOCUMENTS

2011/0281585 A1    11/2011  Kwon
2013/0337818 A1*   12/2013  Biermann .............. H04B 7/022
                                                      455/446

OTHER PUBLICATIONS

LG Electronics; "Cell Clustering and Feedback for CoMP;" 3GPP Draft; 3rd Generation Partnership Project, Mobile Competence Centre; 650, Route des Lucioles, France; Mar. 17, 2009; Seoul, Korea.

* cited by examiner

SELECTION OF ACCESS POINTS FOR COORDINATED MULTIPOINT UPLINK RECEPTION

This application is a 371 of PCT/SE2012/051112, filed Oct. 17, 2012, the disclosure of which is fully incorporated herein by reference.

TECHNICAL FIELD

The proposed technology generally relates to wireless communications, and more specifically to a method and device on the network side of a wireless communication network for selecting, for a user, access points for coordinated multipoint (COMP) uplink reception, as well as a corresponding network node and computer program.

BACKGROUND

Coordinated MultiPoint (COMP) transmission/reception is an advanced technology for cellular communication networks to improve coverage, support high data rates, improve cell-edge throughput and/or to increase system throughput.

Uplink COMP generally implies coordination among multiple geographically separated reception points, and downlink COMP generally implies dynamic coordination among multiple geographically separated transmission points. In general, the basic idea is to perform joint detection in the uplink by jointly processing radio signals received at multiple points, and likewise to perform joint transmission in the downlink by coordinating transmission from multiple points to one or more user terminals.

As an intermediate step towards general COMP operation, so-called intra-site cooperation has been proposed, where different sectors of the same radio base station are coordinated.

It is also possible to coordinate different sectors belonging to different sites, so-called inter-site cooperation, where the data has to be exchanged between the involved radio base stations, or more generally access points, via the so-called backhaul network.

For the uplink, the entity responsible for decoding, typically one of the access points such as a serving radio base station, may thus collect samples from other access points via the backhaul network, and include them in the decoding of the user.

However, it still remains to decide if it is really beneficial to use more than one access point in the uplink and if so which access points to use for COMP uplink reception.

SUMMARY

It is a general object to provide an efficient way of deciding which access points to use for COMP uplink reception.

In particular, it is an object to provide a method on the network side of a wireless communication network for selecting, for a user, access points for coordinated multipoint (COMP) uplink reception.

It is also an object to provide a corresponding computer program.

It is another object to provide a device on the network side of a wireless communication network, wherein the device is configured to select, for a user, access points for coordinated multipoint (COMP) uplink reception.

Still another object is to provide a network node comprising such a device.

These and other objects are met by the invention as defined by the accompanying patent claims.

According to an aspect, there is provided a method on the network side of a wireless communication network for selecting, for a user, access points for coordinated multipoint (COMP) uplink reception. The method comprises the step of obtaining, for each of a number of candidate access points, at least one uplink measurement result. The method also involves the step of combining candidate access points to form at least two different sets of access points from the candidate access points. Further, the method comprises the step of estimating, for each one of the at least two different sets of access points, an uplink quality measure based on the uplink measurement results of the considered set of access points, and the step of determining, for each one of the at least two different sets of access points, a measure representative of the number of transmission opportunities available to the user for the considered set of access points over a given period of time. The method also comprises the step of selecting which one of the at least two different sets of access points to use for COMP uplink reception based on the uplink quality measure and the measure representative of the number of transmission opportunities available to the user over the given period of time.

The proposed technology provides a wise selection of access points for each user by considering both uplink quality, and the number of transmission opportunities available to the user over a given period of time. In this way, it may for example be possible to take the backhaul delay between access points in the backhaul network into account when selecting access points.

According to another aspect, there is provided a computer program for performing, when running on a computer system, such a method.

According to yet another aspect, there is provided a device on the network side of a wireless communication network, wherein the device is configured to select, for a user, access points for coordinated multipoint (COMP) uplink reception. The device comprises a measurement result obtainer configured to obtain, for each of a number of candidate access points, at least one uplink measurement result. The device also comprises a combiner configured to combine candidate access points to form at least two different sets of access points from the candidate access points. Further, the device comprises an estimator configured to estimate, for each one of the at least two different sets of access points, an uplink quality measure based on the uplink measurement results of the considered set of access points, and a determiner configured to determine, for each one of the at least two different sets of access points, a measure representative of the number of transmission opportunities available to the user for the considered set of access points over a given period of time. The device also comprises an access point selector configured to select which one of the at least two different sets of access points to use for COMP uplink reception based on the uplink quality measure and the measure representative of the number of transmission opportunities available to the user over the given period of time.

According to still another aspect, there is provided a network node comprising such a device.

Other advantages will be appreciated when reading the detailed description.

BRIEF DESCRIPTION OF THE DRAWINGS

The proposed technology, together with further objects and advantages thereof, may best be understood by making reference to the following description taken together with the accompanying drawings, in which.

DETAILED DESCRIPTION

Throughout the drawings, the same reference numbers are used for similar or corresponding elements.

In the following the expression "access point" is sometimes referred to as "reception point" and is intended to encompass all types of wireless access devices or units such as radio base stations.

As mentioned in the background section, the access point or entity responsible for decoding may collect samples from other access points via the backhaul network, and include them in the decoding of the user. However, it still remains to decide if it is really beneficial to use more than one access point in the uplink and if so which access points to use for COMP uplink reception.

If reception data from other access points is to be used for uplink reception this data must be transmitted over the backhaul. The inventors have recognized that this may create extra load on the backhaul and it is not certain that the user performance will really improve when additional access points are included. The extra computations and signaling over the backhaul can create extra delay for the user, and the block error rate (BLER) of the user can potentially increase due to channel estimation errors. The extra signaling over the backhaul can also give performance problems for other users and other services and radio access technologies sharing the backhaul.

If the backhaul delay, sometimes also referred to as latency, to some access points is relatively large, it may be better to settle for a lower uplink quality with less access points. On the other hand, if the uplink quality can be increased by including more access point at a reasonable cost with respect to the backhaul delay, it is beneficial to use the additional access points.

The inventors have recognized that the number of transmission opportunities available to the user over a given period of time, i.e. the frequency of transmission opportunities, can be used as a measure to take factors such as backhaul delay, computational load into account when deciding which access points to use for COMP uplink reception. Accordingly, the proposed technology selects suitable access points not only based on a measure of uplink quality but also a measure representative of the number of transmission opportunities available to the user over a given period of time. By way of example, this may be performed by the overall method described below with reference to FIG. 1.

Figure 1:
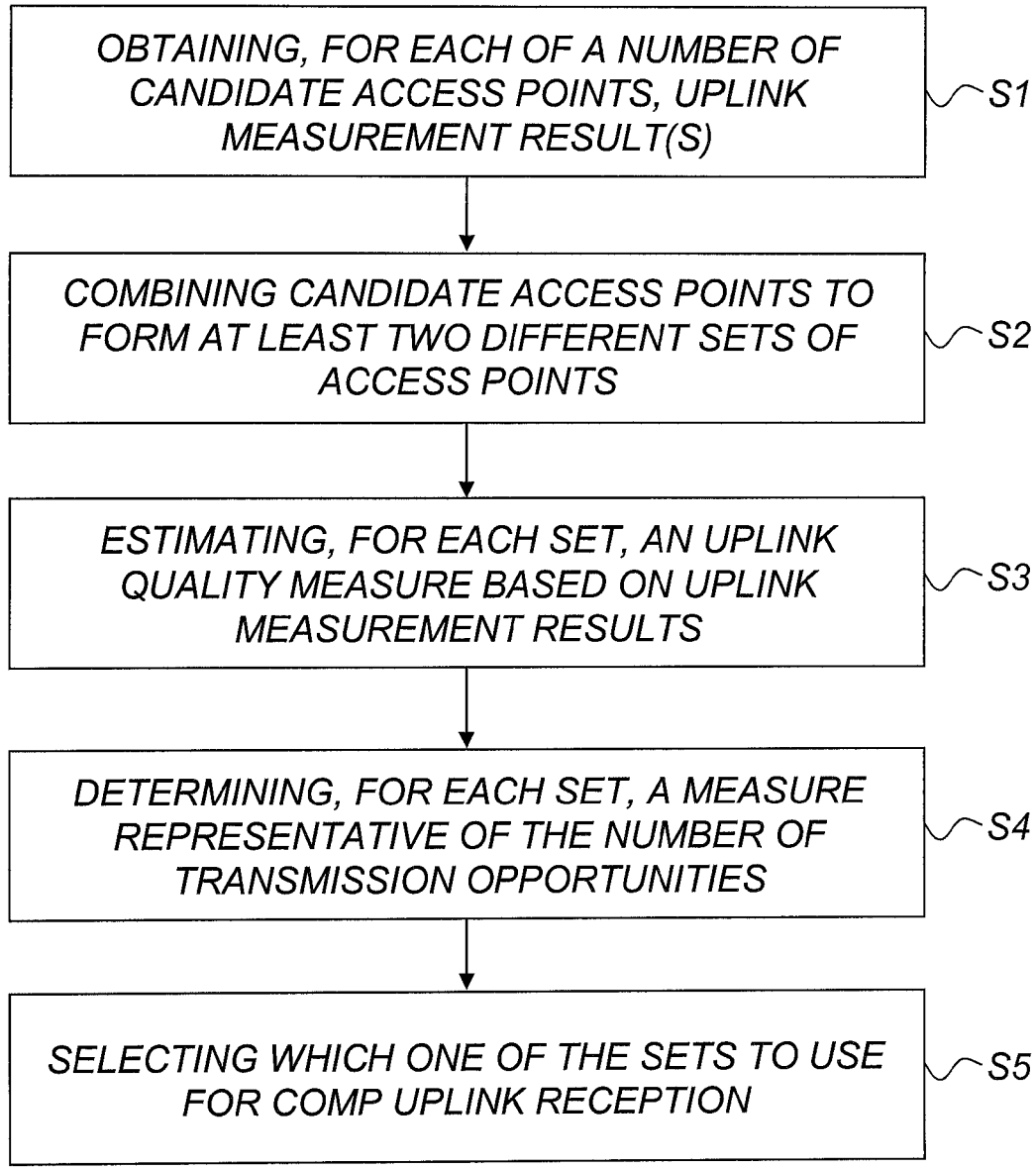
FIG. 1 is a schematic flow diagram illustrating an example of a method for selecting, for a user, access points for coordinated multipoint (COMP) uplink reception according to an embodiment.

FIG. 1 is a schematic flow diagram illustrating an example of a method for selecting, for a user, access points for coordinated multipoint (COMP) uplink reception according to an embodiment. The method comprises the step (S1) of obtaining, for each of a number of candidate access points, at least one uplink measurement result. The method also involves the step (S2) of combining candidate access points to form at least two different sets of access points from the candidate access points. Further, the method comprises the step (S3) of estimating, for each one of the at least two different sets of access points, an uplink quality measure based on the uplink measurement results of the considered set of access points, and the step (S4) of determining, for each one of the at least two different sets of access points, a measure representative of the number of transmission opportunities available to the user for the considered set of access points over a given period of time. The method also comprises the step (S5) of selecting which one of the at least two different sets of access points to use for COMP uplink reception based on the uplink quality measure and the measure representative of the number of transmission opportunities available to the user over the given period of time.

The proposed technology provides a wise selection of access points for each user by considering both uplink quality, and the number of transmission opportunities available to the user over a given period of time. In this way, it may for example be possible to take the backhaul delay between access points in the backhaul network into account when selecting access points.

US Patent Application Publication US 2011/0080879 relates to the particular issue of reducing the complexity of coordinated multipoint reception. For each sector antenna in a set of sector antennas deployed in a COMP cell, a signal strength measurement is made of one or more downlink signals received by a mobile terminal from a sector associated with that sector antenna. The signal strength measurements are compared and a subset of sector antennas are then selected for COMP reception of the uplink signal. By using a subset of sector antennas, instead of all, the computational complexity will be reduced. In order to minimize the performance degradation possibly resulting from performing COMP reception with a reduced number of antennas, those sector antennas that have the strongest signal strength measurements can be included in the selected set of antennas.

Apparently, the method disclosed in US 2011/0080879 is based on downlink signal strength measurements and not uplink measurements, and therefore does not consider uplink quality. Moreover, US 2011/0080879 does not take the number of transmission opportunities available over a given period of time into account. In conclusion, the selection process of US 2011/0080879 differs completely from that of the present invention.

US Patent Application Publication US 2009/0264123 relates to the selection of a serving base station using backhaul quality information. This is not at all concerned with selection of access points for COMP uplink reception, but is merely about selecting a single serving base station from a number of candidate base stations.

It should be understood that COMP points selection for uplink reception generally implies selecting at least two access points so that coordinated multipoint reception can take place.

International Patent Application Publication WO 2012/096449 relates to multi-cell cooperative transmission for increasing the capacity of a mobile station at a cell edge. For a cell-edge mobile station, at least one secondary coverage is determined for the mobile station from among neighbor coverages for base station cooperative transmission to the cell-edge mobile station. Radio resources to the cell-edge mobile station based on downlink channel information reported by the mobile station. Signals are then transmitted to the mobile station using the allocated radio resources through cooperation by base stations of the serving coverage and the secondary coverage(s).

Apparently, WO 2012/096449 is related to multi-cell cooperative transmission to the mobile station, and not COMP uplink reception in multiple access points.

US Patent Application Publication US 2010/0265813 relates to adaptive opportunistic clustering for interference alignment in wireless networks, where clusters of transmitter-receiver pairs is selected based on minimum singular values calculated from direct channel information and the selected pairs are instructed to perform interference alignment. US 2010/0265813 is not concerned about selection of access points for COMP uplink reception.

Figure 2:
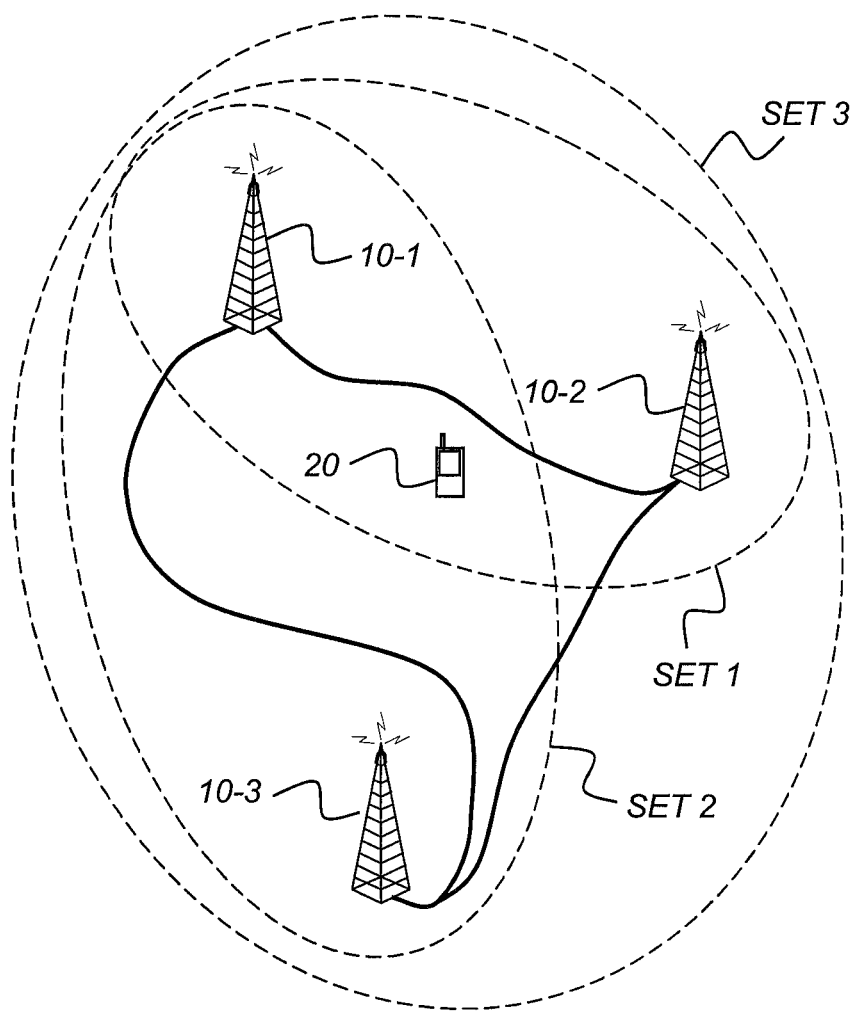
FIG. 2 is a schematic diagram illustrating an example of access points connected via a backhaul network in a wireless communication system.
Figure 3:
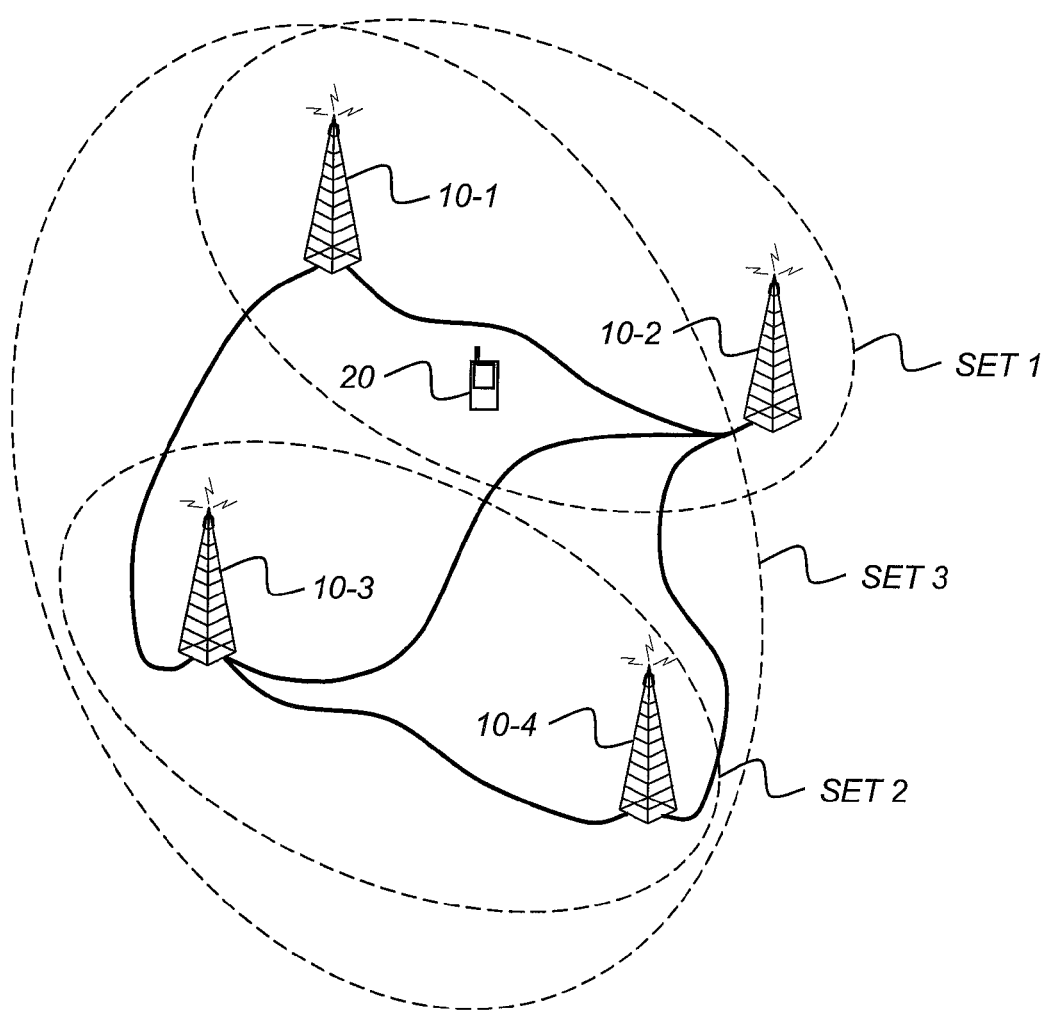
FIG. 3 is a schematic diagram illustrating another example of access points connected via a backhaul network in a wireless communication system.

FIG. 2 is a schematic diagram illustrating an example of access points connected via a backhaul network in a wireless communication system. In this simplified example, the system includes three access points 10-1, 10-2 and 10-3. When deciding which access points to use for COMP uplink reception for a user, here illustrated by a mobile terminal 20, a number of different sets of access points are formed for further evaluation. In this particular example, three different sets of access points SET 1, SET 2, and SET 3 are formed by combining candidate access points. As can be seen, the sets of access points can be at least partially overlapping FIG. 3 is a schematic diagram illustrating another example of access points connected via a backhaul network in a wireless communication system. In the particular example of FIG. 3, there are four access points 10-1, 10-2, 10-3 and 10-4, which are combined to form different sets of access points. As can be seen, it is also possible to have non-overlapping sets of access points.

As implied above, the measure representative of the number of transmission opportunities available to the user over a given period of time may be at least partly dependent on backhaul delay between access points in the backhaul network of the wireless communication network.

The given period of time is normally selected based on system information from the considered wireless communication system. In general, it is advisable to consider a predetermined or selected time horizon for evaluating the number of available transmission opportunities. This may for example be a multiple of the round-trip time of the retransmission process. In LTE, for example, when Hybrid Automatic Repeat Request (HARQ) is used, the time period can be selected as 8 ms. Accordingly, the measure representative of the number of transmission opportunities available to the user over a given period of time may also be dependent on the data retransmission operating mode(s) used in the uplink.

The frequency of transmission opportunities for a given user equipment (UE) may generally depend on various factors such as the load in the cell/system, the retransmission process(es), the radio environment, the UE output power, carrier bandwidth (including carrier aggregation), scheduling factors such as scheduling policy (e.g. proportional fair or round-robin).

At low load, e.g. one UE in the cell, the number of transmission opportunities per time unit, may be determined by the frequency of transmission opportunities allowed by the configuration of the retransmission process, such as HARQ, used by the system. At higher load, a given UE naturally "competes" for the transmission opportunities with other UEs.

By way of example, it can be said that all transmission opportunities are available when only the serving access point is employed for uplink reception, whereas the addition of any additional access point for COMP uplink reception as a simple rule of thumb means that we lose half of the transmission opportunities per time unit.

By way of example, the step of selecting which one of the at least two different sets of access points to use for COMP uplink reception may be based on evaluating uplink quality in relation to the number of transmission opportunities available to the user over the given period of time taking into account the backhaul delay between access points in the backhaul network.

The selection of access points to use for COMP uplink reception may for example be based on considering a difference in uplink quality between the different sets of access points in relation to a corresponding difference in number of transmission opportunities over the given period of time due to a difference in backhaul delay.

Preferably, for each considered set of access points, an individual measure representative of the number of transmission opportunities available to the user over the given period of time is determined.

As mentioned, the uplink quality measure is based on uplink measurement results of the considered set of access points. For example, the uplink quality measure may be representative of Signal-to-Noise Ratio (SNR), Signal-to-Noise-and-Interference Ratio (SINR), Signal-to-Interference Ratio (SIR), or any other suitable uplink quality measure. The uplink measurement results of the considered set of access points originate from measurements performed by the respective access points on the actual uplink(s), and may for example include uplink channel measurements, as will be exemplified later on.

Figure 4:
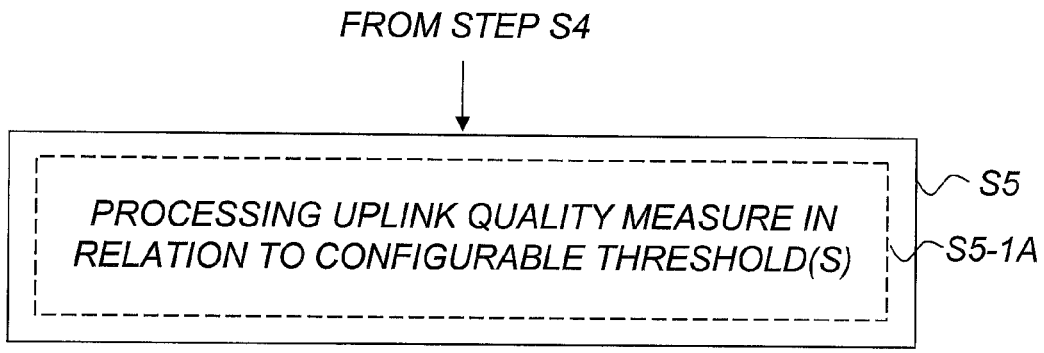
FIG. 4 is a schematic diagram illustrating an example of the selecting step according to a particular embodiment.

FIG. 4 is a schematic diagram illustrating an example of the selecting step according to a particular embodiment. In this example, the step (S5) of selecting which one of the at least two different sets of access points to use for COMP uplink reception comprises the step of processing (S5-1A) the uplink quality measure in relation to at least one configurable threshold.

As an example, the configurable threshold(s) may be dependent on the measure representative of the number of transmission opportunities available to the user for the considered set of access points over the given period of time taking into account backhaul delay from the access points to the entity responsible for uplink decoding.

Figure 5:
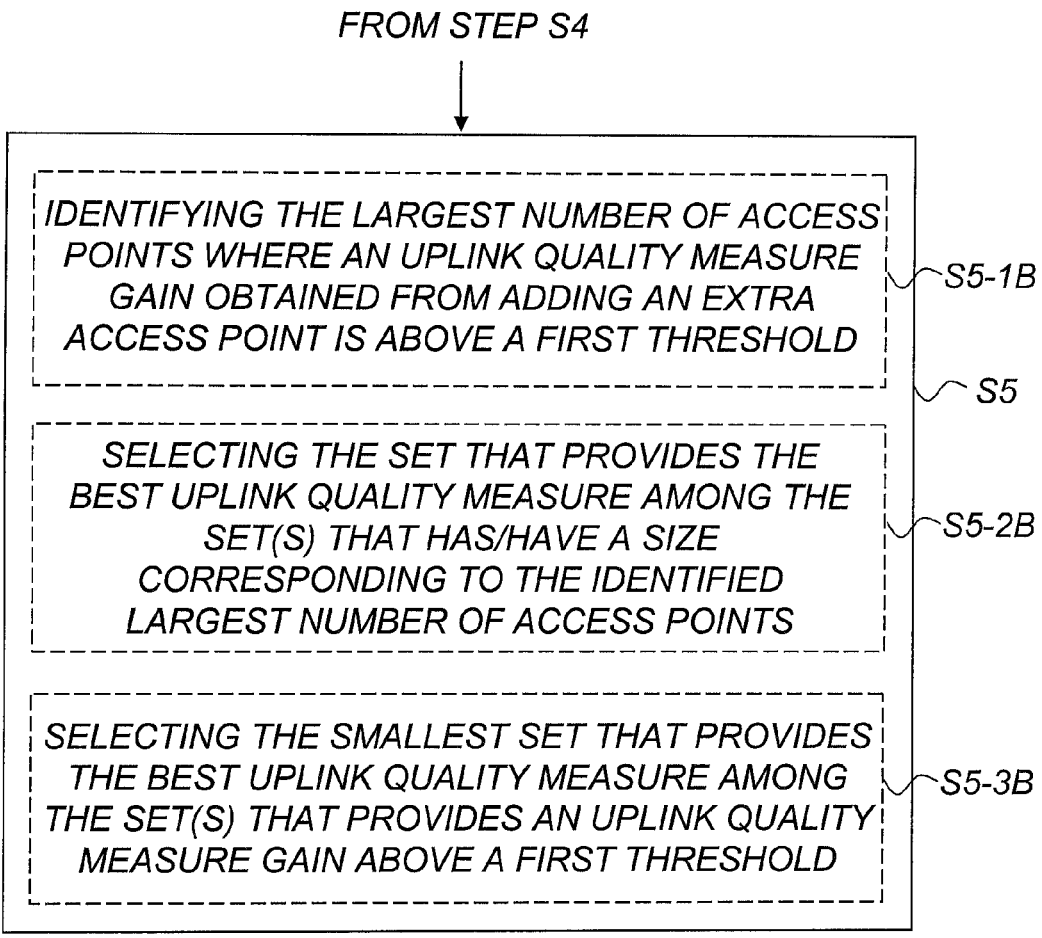
FIG. 5 is a schematic diagram illustrating another example of the selecting step according to a particular embodiment.

FIG. 5 is a schematic diagram illustrating another example of the selecting step according to a particular embodiment. In this example, the step (S5) of selecting which one of the at least two different sets of access points to use for COMP uplink reception comprises the steps of:

identifying (S5-1B) the largest number of access points where an uplink quality measure gain obtained from adding an extra access point is above a first threshold; and selecting (S5-2B) the set of access points that provides the best uplink quality measure among the set(s) that has/have a size corresponding to the identified largest number of access points;

and/or the step of:

selecting (S5-3B) the smallest set of access points that gives an uplink quality measure above a second threshold.

In a particular example, the configurable threshold(s) is/are dependent on the type of session of the user. The configurable threshold may for example be dependent on at least one of:

estimated time the user will be active in a session;
amount of data the user will transmit in the uplink in a session;
estimated spectral efficiency in a session; and
estimated uplink bitrate in a session.

Figure 6:
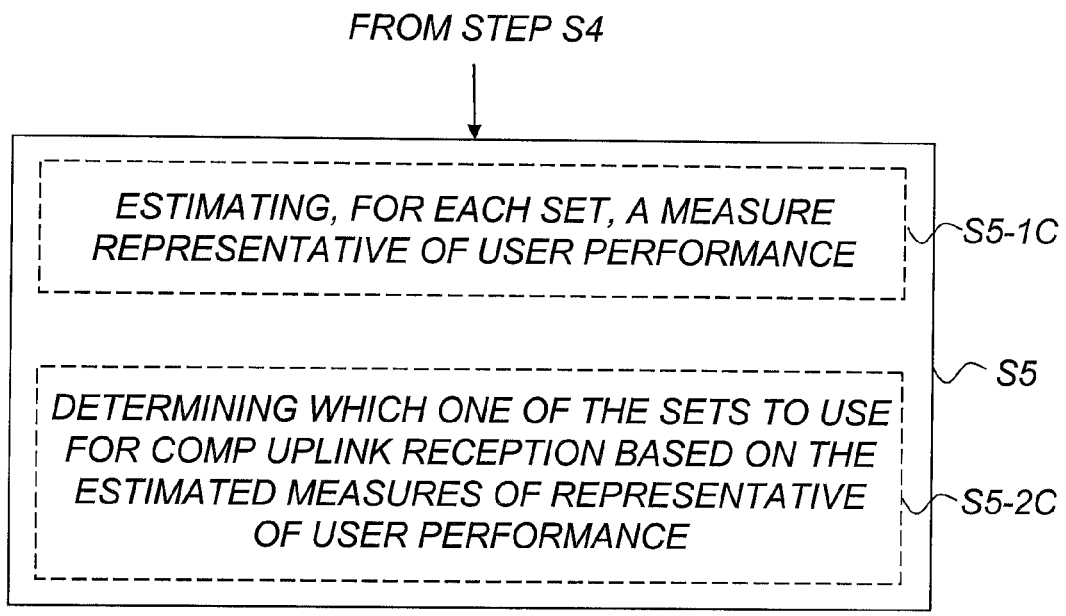
FIG. 6 is a schematic diagram illustrating an example of the selecting step according to another embodiment.

FIG. 6 is a schematic diagram illustrating an example of the selecting step according to another embodiment. In this example, the step (S5) of selecting which one of the at least two different sets of access points to use for COMP uplink reception comprises two steps:

estimating (S5-1C), for each one of the at least two different sets of access points, a measure representative of user performance at least partly based on the uplink quality measure of the considered set of access points and the measure representative of the number of transmission opportunities available to the user for the considered set of access points over the given period of time; and determining (S5-2C) which one of the at least two different sets of access points to use for COMP uplink reception based on the estimated measures representative of user performance.

The user performance may for example be representative of at least one of user throughput and user delay. By way of example, the user performance is representative of uplink bit rate of the user.

If desired, the step (S5-1C) of estimating a measure representative of user performance can be performed also based on a measure representative of the number of resource blocks the user is expected to be assigned.

Figure 7:
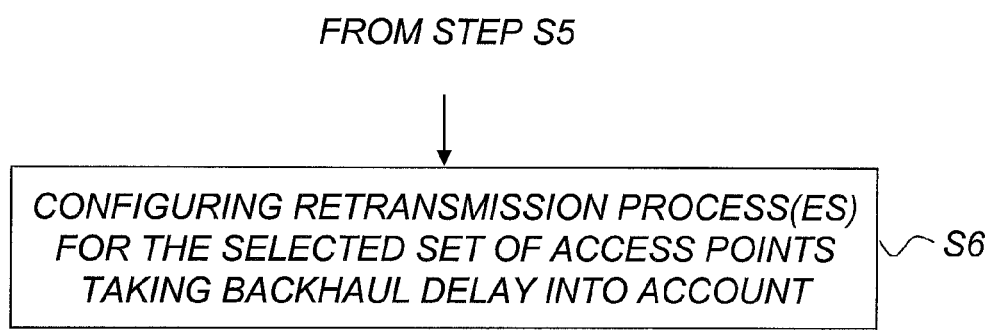
FIG. 7 is a schematic diagram illustrating an example of an additional configuring step according to an embodiment.

FIG. 7 is a schematic diagram illustrating an example of an additional configuring step according to an embodiment. In this example, the overall method further comprises the step (S6) of configuring at least one retransmission process for the selected set of access points taking into account estimated backhaul delay from using the selected set of access points.

As an example, this may include the step of requesting the user to stall the retransmission process(es) until retransmission feedback is obtained from the relevant access points. If more access points are included and there is a corresponding extra latency or delay, the serving access point may not be able to send appropriate feedback with the normal timing and therefore sends a 'WAIT' message to the user. In a sense, a normal transmission opportunity will be 'lost' and the user is requested to wait, keeping the retransmission data in the UE buffer and staying prepared to do a retransmission the next available transmission opportunity.

Examples of retransmission process(es) includes at least one Automatic Repeat Request (ARQ) process and/or at least one Hybrid ARQ (HARQ) process.

In the following, a number of illustrative and non-limiting examples of the proposed technology will be described. Although these examples are discussed with reference to the exemplary case of Long Term Evolution (LTE) systems, it should be understood that the proposed technology is also applicable to other wireless communication systems.

In the particular example of LTE, each eNodeB is typically performing independent scheduling and radio transmission and reception to the UEs connected to the eNodeB serving the UE in the downlink. In the LTE uplink, reception is typically carried out in an eNodeB that serves the UE both in the uplink and in the downlink. For this purpose the eNodeB normally uses some kind of reception-combining, for example, a MMSE reception-combiner and Turbo-decoder. The function of the reception-combiner is to combine the receptions from the antennas in the reception point used by eNodeB and extract the encoded symbols in a good way. The extracted encoded symbols are then used by the Turbo-decoder to extract the encoded information. In a typical deployment the antennas in one reception point is very similar with respect to, for example, long-term SINR.

In a scenario when multiple points of reception are used, the antennas in the different reception points can vary quite a lot with respect to, for example, SINR. Further transmitting data from reception points over the backhaul to the entity for reception-combining normally imposes a large load on the backhaul. The extra load can cause a loss of the system performance, not only for the LTE system but also any other system sharing the backhaul. Further the extra latency and low quality of the measurements in another reception-point may have the consequence that some users using the multipoint reception data sent over the backhaul can actually lose performance. The higher computational load needed for reception-combining can also result in the need for extra hardware that can cost a substantial amount.

In other words, the proposed technology may also be regarded as a way to identify users that will likely benefit from getting reception data sent over the backhaul from other reception points in the network. In a particular example, the method defines measurements that are performed in the eNodeB serving the UE in the uplink and also potentially measurements from other reception points that are then sent over the backhaul. The measurements and metrics calculated from the measurements are then used to decide which reception points should be used by a particular user.

In a LTE radio network, for example, an entity implements a mechanism to autonomously 'turn on' or suggest that a UE would be a good candidate for using multiple reception points in the uplink according to measurements in receptions points in the network. The preference between embodiments is dependent upon the capabilities of the radio network in terms of computational and backhaul capacity.

Figure 8:
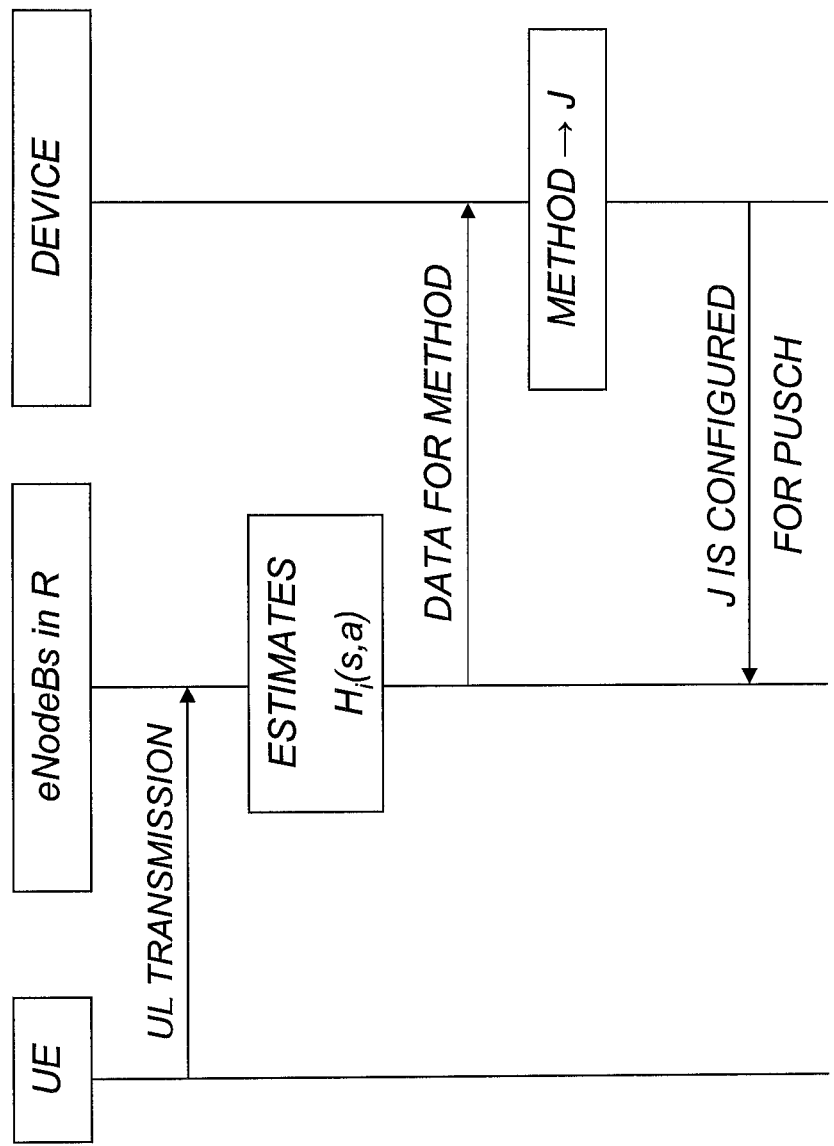
FIG. 8 is a schematic diagram illustrating an example of the selection of a set J of reception points among a set R of candidates according to an embodiment.
Figure 9:
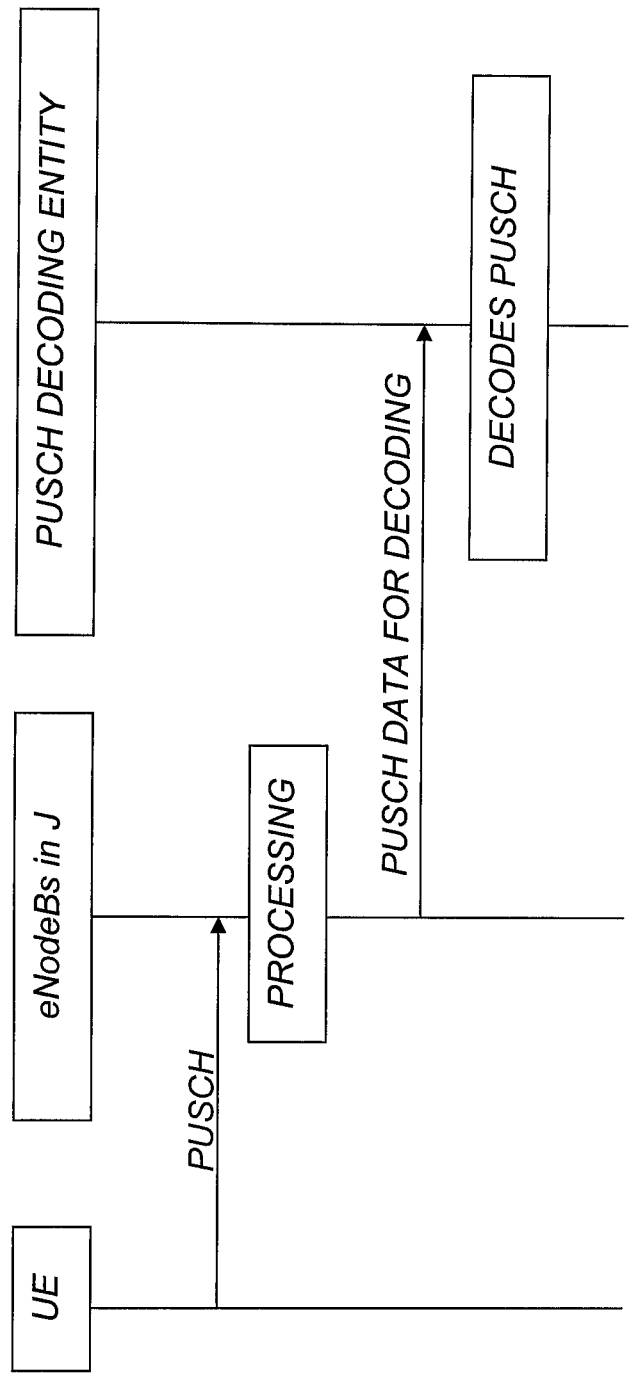
FIG. 9 is a schematic diagram illustrating an example of COMP reception in the set J of reception points.

The embodiments described below are used to pick the set of reception points J among a set of candidates R, as illustrated in FIG. 8 used for Physical Uplink Shared Channel (PUSCH) reception on the network side, as illustrated in FIG. 9. FIG. 8 is a schematic diagram illustrating an example of the selection of a set J of reception points among a set R of candidates according to an embodiment. FIG. 9 is a schematic diagram illustrating an example of COMP reception in the set J of reception points.

The reception points should be picked in a way such that only those reception points that are beneficial to use are included when doing PUSCH reception.

Figure 10:
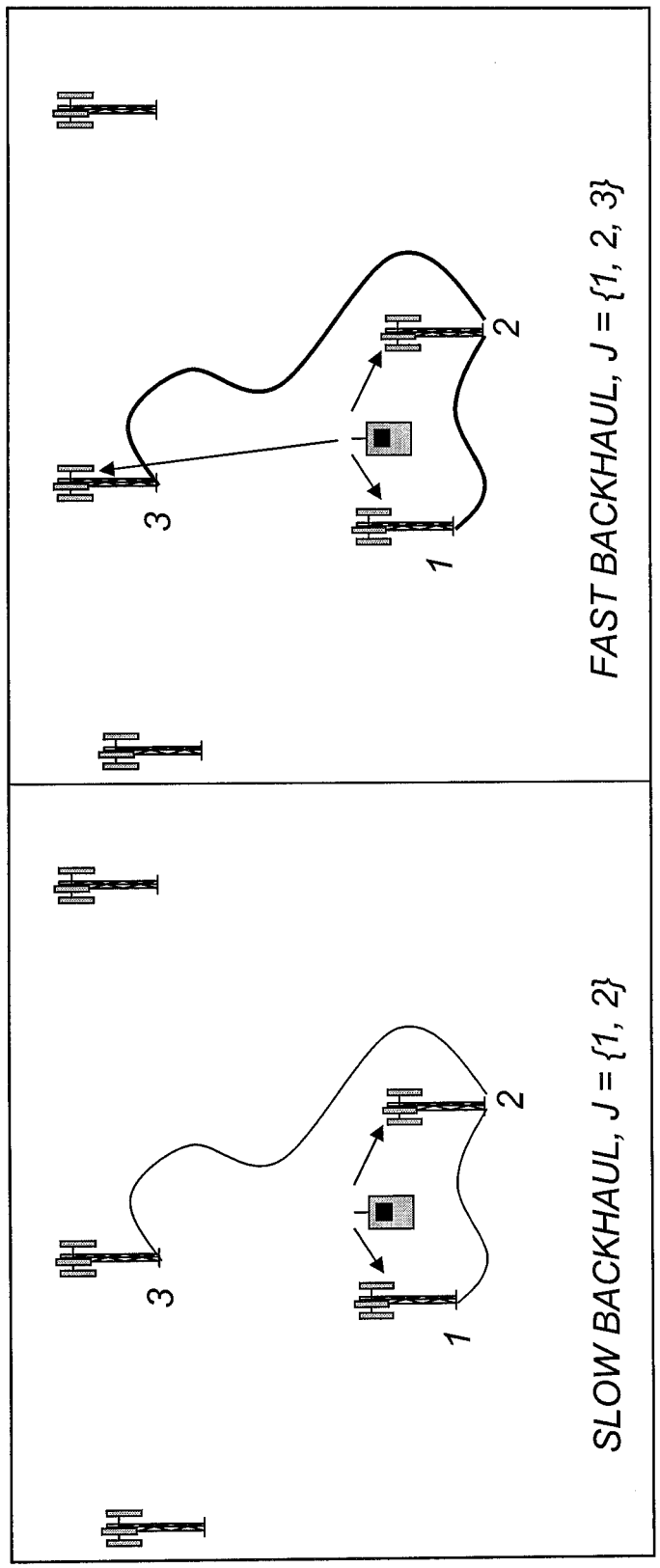
FIG. 10A is a schematic diagram illustrating an example of a wireless communication scenario with a selected set J={1, 2} of reception points when the backhaul is relatively slow.
FIG. 10B is a schematic diagram illustrating an example of a wireless communication scenario with a different selected set J={1, 2, 3} of reception points when the backhaul is relatively fast.

Which receptions points should be used can depend upon, for example, how good the radio conditions are between the UE and reception points but also how fast the backhaul is between the reception points, as illustrated in FIGS. 10A-B. FIG. 10A is a schematic diagram illustrating an example of a wireless communication scenario with a selected set J={1, 2} of reception points when the backhaul is relatively slow. FIG. 10B is a schematic diagram illustrating an example of a wireless communication scenario with a different selected set J={1, 2, 3} of reception points when the backhaul is relatively fast.

Although the uplink quality measure will mainly be discussed with reference to SINR below, the skilled person will understand that any other suitable uplink quality measure may be used.

SINR Gain Threshold

In a set of reception points R, each reception point i makes a channel measurement $H_i(s,a)$ for an UE A on the OFDM reference symbols s and antennas a used in the network at reception point $i \in R$. These values are used to estimate an effective SINR (in dB):

$$SINR_{effective}(H_i; i \in I), \text{ for some subset of reception points } I \subseteq R.$$

The estimated effective SINR is the SINR after receiver combining used in the network, for example, in Single Carrier Orthogonal Frequency Division Multiplex (SC-OFDM) used in the uplink in LTE this could be combining over all antennas and sub-carriers. This can, for example, be done in the receiver combining entity after transmitting the channel measurements $H_i(s,a)$ over the backhaul to this entity. But in other implementations parts of the calculations can be performed at the reception points and instead, for example, estimated SINR after antenna combining can be calculated per reference symbol in the eNodeB at the reception point and transmitted over the backhaul to the entity deciding whether multi-point reception should be used.

Independent of which signaling scheme is used the entity deciding which reception points should be used calculates the highest effective SINR using n reception points:

$$SINR_{max}(n) = \max(SINR_{effective}(H_i; i \in I) | size(I) = n)$$

Observe that we here define $SINR_{max}(0) = -\infty$.
Then picks the value N(T) such that:

$$N(T) = \arg \max_n(n | SINR_{max}(i) - SINR_{max}(i-1) > T, 0 < i \le n),$$

where T is a configured threshold that depends upon the network deployment and the capabilities of the receiving and calculating entities and which computational and backhaul load is acceptable. It could also be likely that a maximum limit could be configured, such that, $N(T) \le N_{max}$.

Then for the UE A we use the set:

$$J = \arg \max_I(SINR_{effective}(H_i; i \in I) | size(I) = N(T)),$$

i.e. the set of receiving points of size N(T) that gives the best effective SINR and also gives a gain of at least the one stipulated by the threshold T. Observe that in some implementation one reception point $k \in R$ will be forced to be included in the set I, for example, the uplink reception point belonging to the eNodeB that the UE is currently connected to, the only difference is then that instead of considering sets $I \subseteq R$ we will consider sets $I \subseteq R$ and $k \in I$.

The above embodiment may be preferred for a high capacity case.

SINR Threshold

In a set of reception points R, each reception point i makes a channel measurement $H_i(s,a)$ for an UE A on the OFDM reference symbols s and antennas a used in the network at reception point $i \in R$. These values are used to estimate an effective SINR (in dB):

$$SINR_{effective}(H_i; i \in I), \text{ for some subset of reception points } I \subseteq R.$$

The estimated effective SINR is the SINR after receiver combining used in the network, for example in SC-OFDM used in the uplink in LTE this could be combining over all antennas and sub-carriers. This can, for example, be done in the receiver combining entity after transmitting the channel measurements $H_i(s,a)$ over the backhaul to this entity. But in other implementations parts of the calculations can be performed at the reception points and instead, for example, estimated SINR after antenna combining can be calculated per reference symbol in the eNodeB at the reception point and transmitted over the backhaul to the entity deciding whether multi-point reception should be used.

Independent of which signaling scheme is used the entity deciding which reception points should be used calculates the highest effective SINR using n reception points:

$$SINR_{max}(n) = \max(SINR_{effective}(H_i; i \in I) | size(I) = n)$$

Observe that here we define $SINR_{max}(0) = -\infty$.
Then picks the value M(T) such that:

$$M(T) = \arg \min_n(n | SINR_{max}(n) > T)$$

or if no such n exists:

$$M(T) = \arg \max_n(SINR_{max}(n)),$$

where T is a configured threshold that depends upon the network deployment and the capabilities of the receiving and calculating entities and which computational and backhaul load is acceptable.

It could also be likely that a maximum limit could be configured such that $M(T) \le M_{max}$.

Then for the UE A we use the set:

$$J = \arg \max_I(SINR_{effective}(H_i; i \in I) | size(I) = M(T)),$$

i.e. the smallest set of receiving points of size M(T) that gives an effective SINR above the level stipulated by the threshold T or if no such set exists we pick the set that gives the highest estimated effective SINR. Observe that in some implementations one reception point $k \in R$ will be forced to be included in the set I, for example, the uplink reception point belonging to the eNodeB that the UE is currently connected to, the only difference is then that instead of considering sets $I \subseteq R$ we will consider sets $I \subseteq R$ and $k \in I$.

Static Combined SINR and SINR Gain Threshold

It is also possible use one threshold $T_{gain}$ for the SINR gain and another threshold $T_{SINR}$ for the SINR. Then a static approach can be used where the maximum or minimum is used to decide how many reception points should be used:

$$Q_{min}(T_{gain}, T_{SINR}) = \min(N(T_{gain}), M(T_{SINR})), \text{ or}$$

$$Q_{max}(T_{gain}, T_{SINR}) = \max(N(T_{gain}), M(T_{SINR})).$$

The most likely implementation would be $Q_{min}$ as this would give a resource efficient solution.

This could be preferred in a less high capacity scenario when saving recourses is a priority.

Dynamic Combined SINR and SINR Gain Threshold

It is also possible to use a dynamic approach to automatically alter the set of reception points R. In this embodiment we can pick the number of reception points $Q_{min}$ as defined above and the corresponding set of reception points J. The approach uses a criterion to increase the size of R if the SINR is too low and a criterion for removing reception points in R if a reception point does not give sufficient SINR gains.

Figure 11:
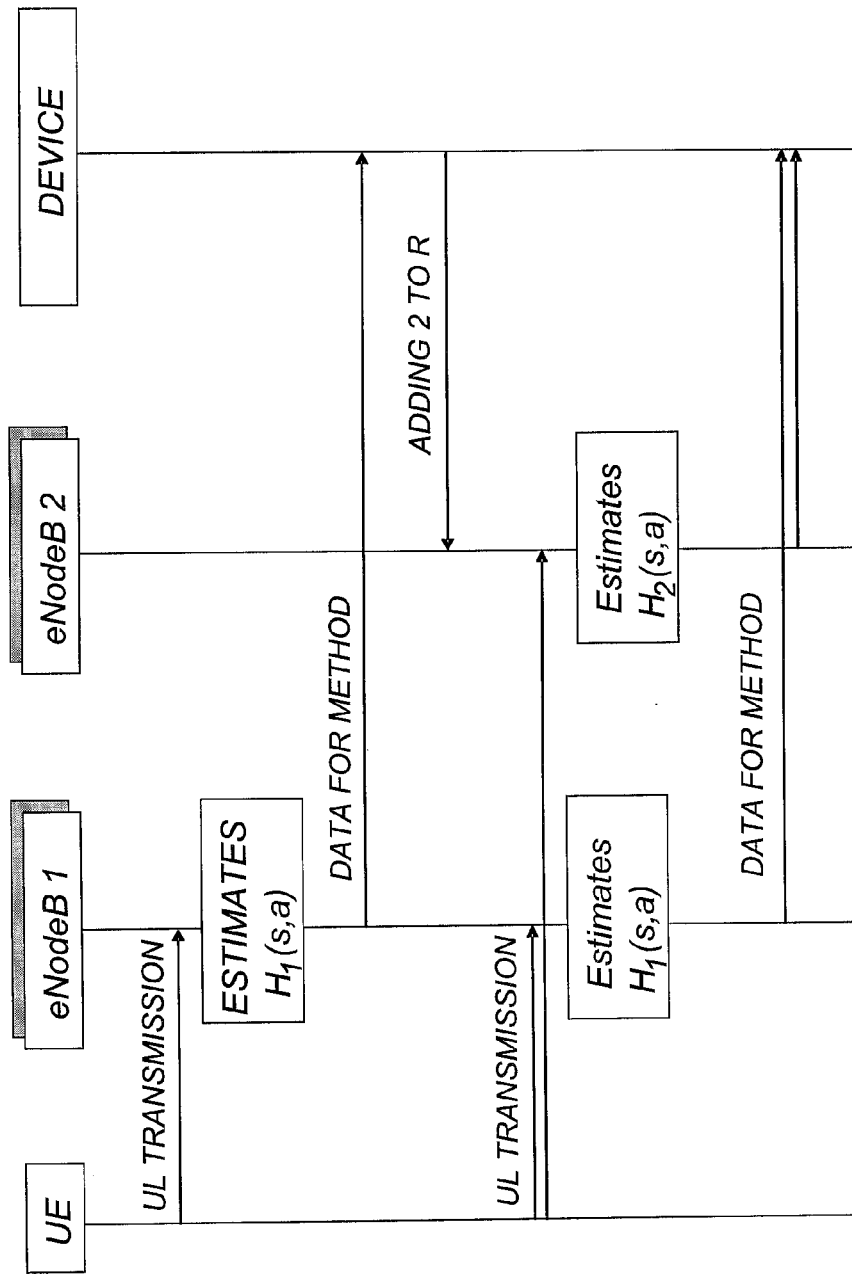
FIG. 11 is a schematic diagram illustrating an example of adding an extra reception point to the candidate set R according to an embodiment.

The criterion for adding an extra reception point to R can be:

If $\max(SINR_{max}(n))<T_{SINR}$ add new reception point to R, as illustrated in FIG. 11.

Figure 12:
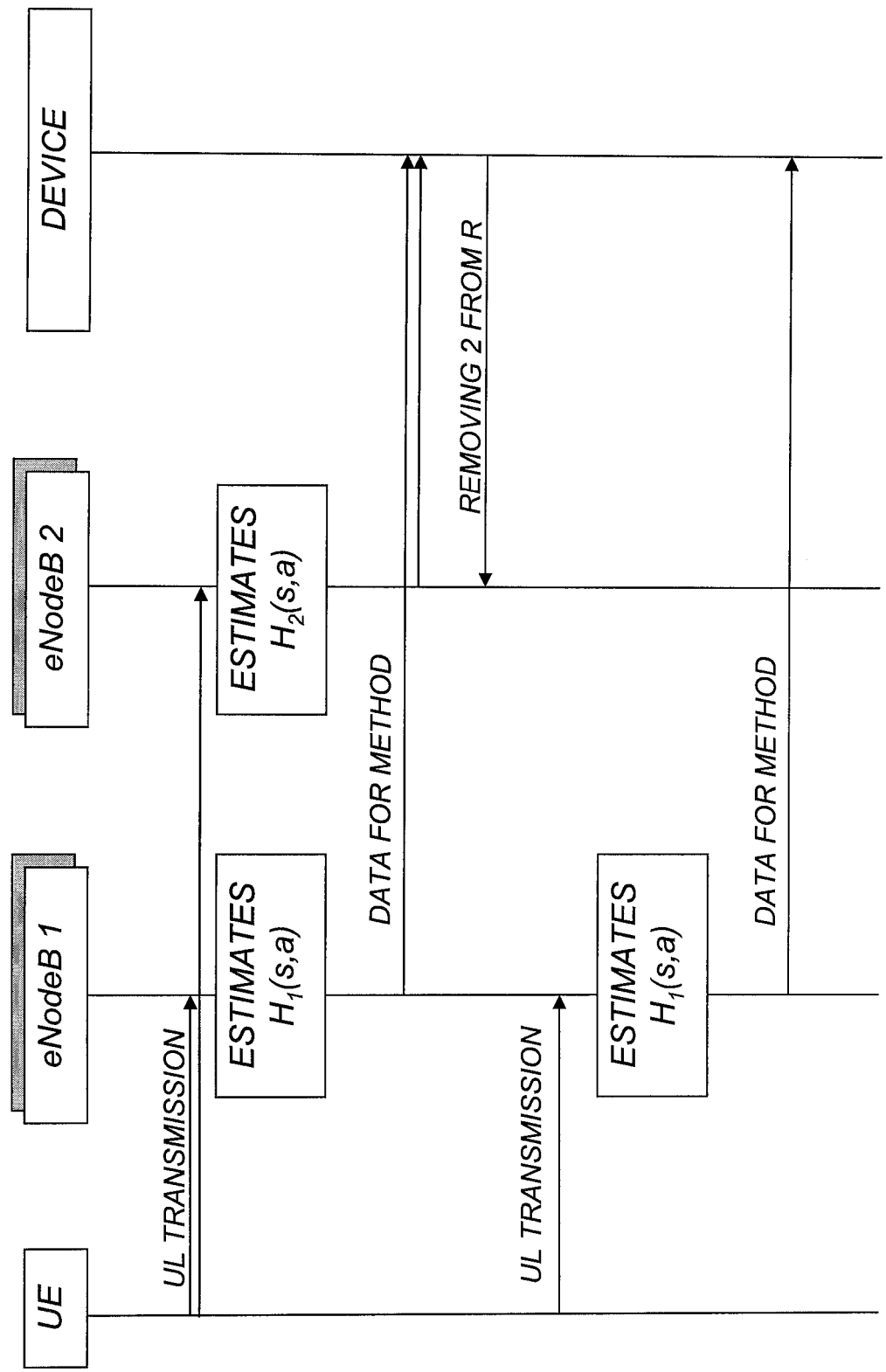
FIG. 12 is a schematic diagram illustrating an example of removing a reception point from the candidate set R according to an embodiment.

The criterion for removing a reception point j from R can be:

If a reception point $j \in R$ and $j \notin J$ then remove j from R, as illustrated in FIG. 12.

Dynamic Combined SINR and SINR Gain Threshold

In a radio network implementing one threshold $T_{gain}$ for the SINR gain and another $T_{SINR}$ for the SINR, a dynamic approach can be used to automatically alter the set of reception points R. In this embodiment we can pick the number of reception points $Q_{max}$ as defined above and the corresponding set of reception points J. The approach uses a criterion to increase the size of R if the SINR is too low and a criterion for removing reception points in R if a reception point does not give sufficient SINR gains.

The criterion for adding an extra reception point to R van be:

If J=R add new reception point to R, as illustrated in FIG. 11.

The criterion for removing a reception point j from R can be:

If a reception point $j \in R$ and $j \notin J$ then remove j from R, as illustrated in FIG. 12.

Session Type User Selection

From a system perspective and due to protocol and signaling issues, enabling multi point reception is normally mostly beneficial for users that will be using the uplink for a long time in the system and/or consume a lot of radio resources. A user will be a long time in the system and consume a lot of radio resources if the user have a lot of data to transmit in the uplink in relation to how good radio quality the user has. The time that the user will be using the uplink is also influenced by the amount of data the user will transmit in the downlink and the service that the user is using.

In this particular embodiment, the system will on the network side estimate the session data S for a user. This session data can then give, for example:

estimated time that the user will be in the system Time (S,J);
  the amount of data that the user will transmit in the uplink $Data_{UL}(S)$;
  the estimated spectral efficiency (for example, measured as number of bits per resource block) of the user BitsRB(S,J);
  the estimated uplink bitrate, $Bitrate_{UL}(S,J)$ given that we use some set of uplink reception points J.

The estimated spectral efficiency can be estimated using the user's physical radio capacity, which in turn can be estimated by, for example, $SINR_{effective}(H_i; i \in J)$ and the Shannon capacity.

The estimated bitrate of a user is normally influenced by the spectral efficiency and the number of scheduling opportunities that the user has access to over a given period of time and how many resource blocks the user can expect to be assigned. The number of scheduling opportunities can for example decrease if the latency is increased by including a new reception point, as this can imply that the user cannot use all scheduling opportunities as dictated by the synchronized HARQ implementation used in the LTE uplink for example.

By way of example, suppose we add delay so that we cannot utilize an HARQ-process every time and that we lose 50% of the scheduling opportunities. This implies that in order to improve the user bitrate, the gain in SINR must be sufficiently large so that the user can transmit >100% more data each time. This can approximately be implemented as a SINR gain threshold T for use with the embodiments described above.

But on the other hand, the number of scheduling opportunities per time unit can increase if $SINR_{effective}(H_i; i \in J)$ is improved and the user does not need as many uplink resources if the user is limited by how many resource blocks the user can expect. For example, assume that the system has one resource per transmission time interval (TTI), and a user needs resources every fifth TTI. As an example, without COMP the user may need 3 resources and with COMP the user may need 2 resources (due to higher effective SINR with COMP so that more bits can be sent per TTI).

Without COMP the situation can be illustrated in the following way:

xxxooxxxooxxxoo . . . , where 'x' indicates a used TTI and 'o' indicates an empty (unused) TTI.

With COMP the situation can be illustrated in the following way:

xxoooxxoooxxooo . . . , which implies that the number of empty (unused) TTIs has increased from '2 out of 5' to '3 out of 5'. In other words, the number of available scheduling opportunities per time unit has increased by 50%.

We can define thresholds for changing multipoint reception set from $J_{old}$ to the set $J_{new}$ using thresholds such as:

$Time(S,J_{old})>Thr(Time)$, that is, the session duration is sufficiently long;
  $Data_{UL}(S)>Thr(Data)$, that is, the amount of session data is large enough;
  $Bitrate(S,J_{new})-Bitrate(S,J_{old})>Thr(Bitrate\_increase)$, that is, the bitrate increases sufficiently;
  $BitsRB(S,J_{new})-BitsRB(S,J_{old})>Thr(Efficency\_increase)$, that is, the efficiency increases sufficiently.

Observe that the two last thresholds could both be an absolute increase and a relative increase depending whether a linear or logarithmic scale is used. Observe also that $J_{old}$ can, for example, be the single reception point used by a single eNodeB serving the user both in the uplink and downlink.

This particular embodiment can be combined with any of the previously described embodiments, and it is also possible to combine the different alternatives in this particular embodiment, for example combine the data and efficiency threshold to filter out users with a lot of data that will get better efficiency in order to save system resources.

The proposed technology gives mechanisms to effectively choose which reception points should be used to receive the uplink from an UE in a radio network. This can be done to ensure a limited level of backhaul usage and computational load for a given performance advantage of using multiple reception points. The method can be used to achieve gains and/or avoid performance drops from multipoint reception points even in the presence of backhaul delay and measurement impairments, such as, channel and covariance estimation errors.

In some sense, the proposed technology can be considered as based on evaluating measurement reports originating from uplink measurements in a set of reception points and picking reception points using performance criteria.

The performance criteria may be dynamically updated using:
 User delay sensitivity.
 Backhaul capacity and load, for example, if load is too high, stricter performance criteria are picked.
 User resource load.
 Uplink receiver performance, for example, channel estimation noise and interference sensitivity.

A measurement report may include:
 Channel and interference estimates at a reception point.
 Backhaul delay and load.

Evaluating measurement reports may include:
 Estimating uplink quality such as SINR using a set of reception points.
 Evaluating performance criteria for different sets of reception points.

Picking reception points may include:
 Comparing estimated uplink quality such as SINR using different sets of reception points with performance criteria and picking the set of reception points best fulfilling performance criteria.
 Evaluating the estimated throughput for the user taking into account the estimated SINR using different reception points and number of transmission opportunities available taking into account the estimated backhaul delay to the reception points and available retransmission process (e.g. HARQ) operating modes.

A reception point may be used if using the reception point increases estimated uplink quality such as SINR more than a network set threshold taking into account the estimated added delay using the reception point.

Scheduling a transmission of the user to use a set of reception points:
 Signalling the set of receptions points to receive and over the backhaul transmit reception data for the transmission to the decoding entity.
 Configuring a retransmission process (e.g. HARQ) to be used for the transmission taking into account the estimated added delay from using the set of reception points.

Figure 13:
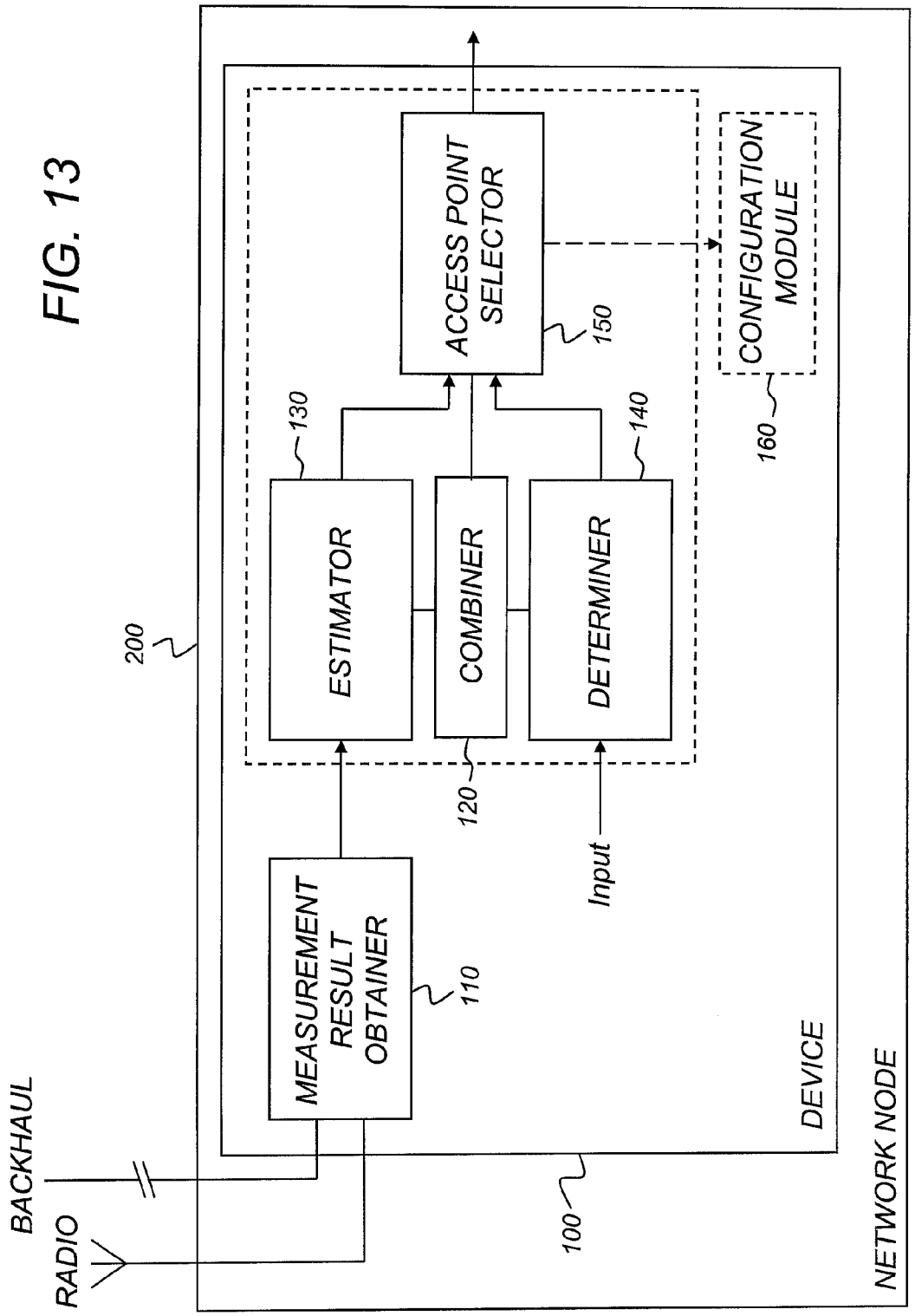
FIG. 13 is a schematic block diagram illustrating an example of a device configured to select, for a user, access points for COMP uplink reception, and a network node comprising such a device according to an embodiment.

FIG. 13 is a schematic block diagram illustrating an example of a device configured to select, for a user, access points for COMP uplink reception, and a network node comprising such a device according to an embodiment. The device 100 basically comprises a measurement result obtainer 110, a combiner 120, an estimator 130, a determiner 140 and an access point selector 150, and an optional configuration module 160. The measurement result obtainer 110 is configured to obtain, for each of a number of candidate access points, at least one uplink measurement result. The combiner 120 is configured to combine candidate access points to form at least two different sets of access points from the candidate access points. The estimator 130 is configured to estimate, for each one of the at least two different sets of access points, an uplink quality measure based on the uplink measurement results of the considered set of access points. The determiner 140 is configured to determine, for each one of the at least two different sets of access points, a measure representative of the number of transmission opportunities available to the user for the considered set of access points over a given period of time. The access point selector 150 is configured to select which one of the at least two different sets of access points to use for COMP uplink reception based on the uplink quality measure and the measure representative of the number of transmission opportunities available to the user over the given period of time.

As readily understood by the skilled person, the combiner 120 may be implemented as an integral part of the estimator 130, the determiner 140 and the access point selector.

Preferably, the determiner 140 may be configured to determine the measure representative of the number of transmission opportunities available to the user over the given period of time at least partly in dependence on backhaul delay between access points in the backhaul network of the wireless communication network.

The determiner 140 may also be configured to determine the measure representative of the number of transmission opportunities available to the user over the given period of time in dependence on the data retransmission operating mode(s) used in the uplink.

By way of example, the access point selector 150 is configured to evaluate uplink quality in relation to the number of transmission opportunities available to the user over the given period of time taking into account the backhaul delay between access points in the backhaul network for selecting which one of the at least two different sets of access points to use for COMP uplink reception.

In particular, the access point selector 150 may be configured to consider a difference in uplink quality between the at least two different sets of access points in relation to a corresponding difference in number of transmission opportunities over the given period of time due to a difference in backhaul delay.

The access point selector 150 can for example be configured to process the uplink quality measure in relation to at least one configurable threshold for selecting which one of the at least two different sets of access points to use for COMP uplink reception.

In a particular example, the access point selector 150 is then configured to operate based on at least one configurable threshold that is dependent on the measure representative of the number of transmission opportunities available to the user for the considered set of access points over the given period of time taking into account backhaul delay from the access points to the entity responsible for uplink decoding.

The access point selector 150 can be configured to identify the largest number of access points where an uplink quality measure gain obtained from adding an extra access point is above a first threshold and select the set of access points that provides the best uplink quality measure among the set(s) has/have a size corresponding to the identified largest number of access points, and/or configured to select the smallest set of access points that gives an uplink quality measure above a second threshold, according to the procedures previously described.

It is also possible to configure the access point selector 150 for operation based on at least one configurable threshold that is dependent on the type of session of the user.

In an alternative embodiment, the access point selector 150 is configured to estimate, for each one of the at least two different sets of access points, a measure representative of user performance at least partly based on the uplink quality measure of the considered set of access points and the measure representative of the number of transmission opportunities available to the user for the considered set of access points over the given period of time. The access point selector 150 is then also configured to determine which one of the at least two different sets of access points to use for COMP uplink reception based on the estimated measures representative of user performance.

For example, the access point selector 150 can be configured to operate based on user performance representative of at least one of user throughput and user delay. The user performance may be representative of uplink bit rate of the user.

It is also possible for the access point selector 150 to be configured to estimate the measure representative of user performance also based on a measure representative of the number of resource blocks the user is expected to be assigned.

As indicated by the dashed lines in FIG. 13, the device 100 may also include a configuration module 160 configured to perform configuration of at least one retransmission process for the selected set of access points taking into account estimated backhaul delay from using the selected set of access points. Preferably, the configuration module 160 may be configured to request the user to stall the considered retransmission process(es) until retransmission feedback is obtained from the relevant access points. For example, the configuration module 160 is configured to perform configuration of at least one Automatic Repeat Request (ARQ) process and/or at least one Hybrid ARQ (HARQ) process.

As illustrated in FIG. 13, the device 100 may be implemented in a network node 200.

It will be appreciated that the methods and devices described above can be combined and re-arranged in a variety of ways, and that the methods can be performed by one or more suitably programmed or configured digital signal processors and other known electronic circuits, e.g. discrete logic gates interconnected to perform a specialized function, or application-specific integrated circuits.

Many aspects of the proposed technology are described in terms of sequences of actions that can be performed by, for example, elements of a programmable computer system.

The steps, functions, procedures and/or blocks described above may be implemented in hardware using any conventional technology, such as discrete circuit or integrated circuit technology, including both general-purpose electronic circuitry and application-specific circuitry.

Alternatively, at least some of the steps, functions, procedures and/or blocks described above may be implemented in software for execution by a suitable computer or processing device such as a microprocessor, Digital Signal Processor (DSP) and/or any suitable programmable logic device such as a Field Programmable Gate Array (FPGA) device and a Programmable Logic Controller (PLC) device.

It should also be understood that it may be possible to re-use the general processing capabilities of any device or unit in which the present technology is implemented, such as a base station, network controller or scheduling node. It may also be possible to re-use existing software, e.g. by reprogramming of the existing software or by adding new software components.

In the following, an example of a computer-implementation will be described with reference to FIG. 14.

Figure 14:
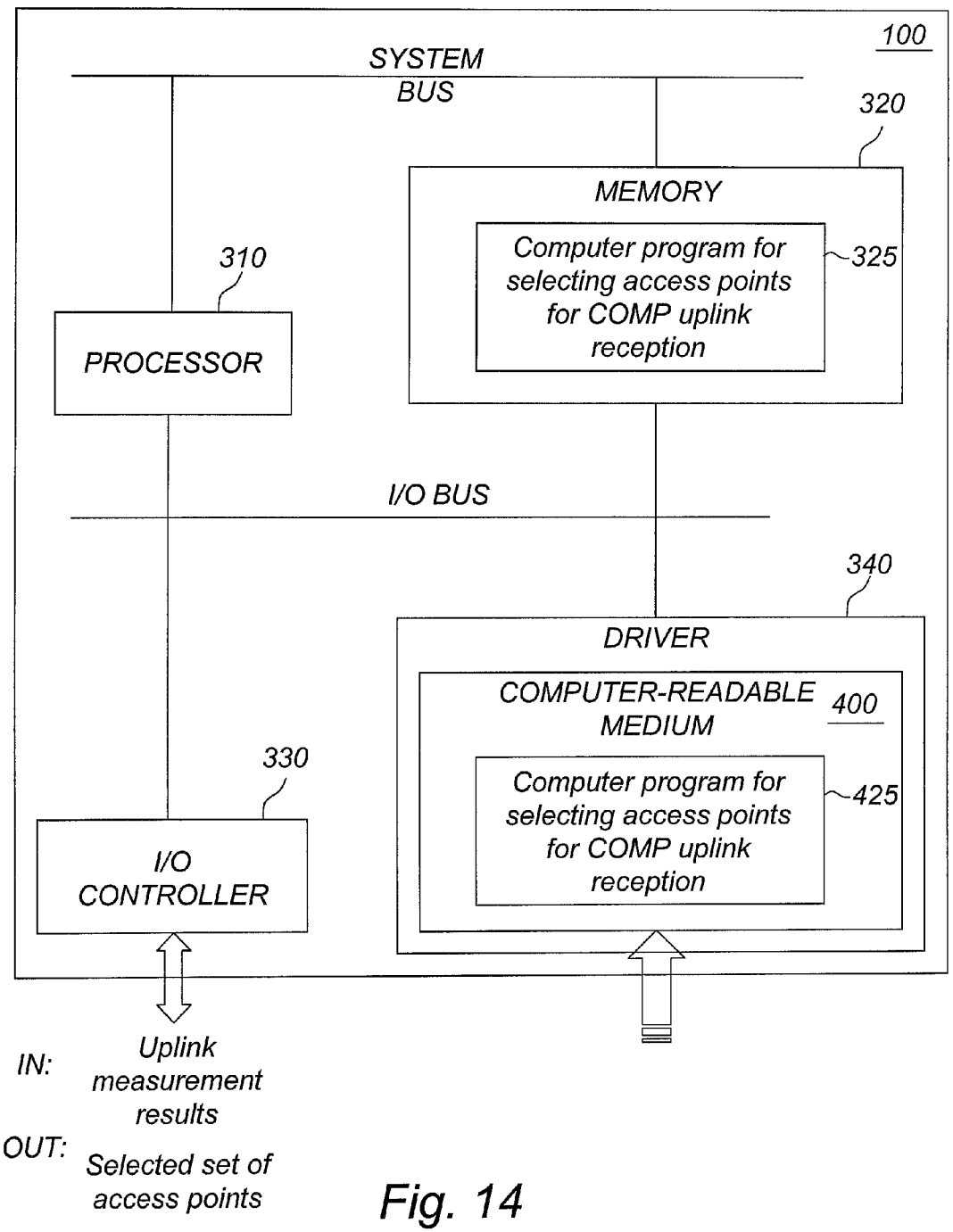
FIG. 14 is a schematic diagram illustrating an example of a computer-implementation of the selection of access points for COMP uplink reception according to an embodiment.

FIG. 14 is a schematic diagram illustrating an example of a computer-implementation of the selection of access points for COMP uplink reception including a computer program for execution by a suitable processor. The device 100 of this embodiment is based on a processor 310 such as a micro processor or digital signal processor, a memory 320, an input/output (I/O) controller 330 and an optional driver 340 for a computer-readable medium 400.

In this particular example, at least some of the steps, functions and/or blocks described above are implemented in software, which is loaded into memory 320 for execution by the processor 310. The processor 310 and the memory 320 are interconnected to each other via a system bus to enable normal software execution. The I/O controller 330 may be interconnected to the processor 310 and/or memory 320 via an I/O bus to enable input and/or output of relevant data such as input parameter(s) and/or resulting output parameter(s).

In this particular example, the memory 320 includes a computer program 325 for implementing the functionality of the embodiments described above including steps, functions, procedures and/or blocks. In particular, the computer program 325 includes software for selecting access points for COMP uplink reception.

More particularly, the I/O controller 330 may receive uplink measurement results that can be transferred to the processor 310 and/or memory 320 for use as input during execution of the computer program 325 to perform the proposed access point selection mechanism. The corresponding selected set of access points may finally be transferred as output via the I/O controller 330.

Moreover, the present technology can additionally be considered to be embodied within any form of computer-readable storage medium having stored therein an appropriate set of instructions for use by or in connection with an instruction-execution system, apparatus, or device, such as a computer-based system, processor-containing system, or other system that can fetch instructions from a medium and execute the instructions. The software, here exemplified in the form of computer program 425, may then be realized as a computer program product, which is normally carried on a non-transitory computer-readable medium 400, for example a CD, DVD, USB memory, hard drive or any other conventional memory device. The software may thus be loaded into the memory 320 of the device 100 or equivalent computer or processing system for execution by the processor 310.

The computer/processor/controller does not have to be dedicated to execute only the above-described steps, functions, procedure and/or blocks, but may also execute other software tasks.

The embodiments described above are merely given as examples, and it should be understood that the proposed technology is not limited thereto. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

The invention claimed is:

1. A method on the network side of a wireless communication network for selecting, for a user, access points for coordinated multipoint (COMP) uplink reception, wherein said method comprises:
   obtaining, for each of a number of candidate access points, at least one uplink measurement result;
   combining candidate access points to form at least two different sets of access points from said candidate access points;
   for each one of said at least two different set of access points:

estimating an uplink quality measure based on the uplink measurement results of the set of access points;

determining a measure representative of the number of transmission opportunities available to the user for the set of access points over a given period of time, said measure representative of the number of transmission opportunities being at least partly dependent on a data retransmission operating mode used in at least one uplink of the set of access points; and selecting which one of said at least two different sets of access points to use for COMP uplink reception based on said uplink quality measure and said measure representative of the number of transmission opportunities available to the user over said given period of time.

2. The method of claim 1, wherein said measure representative of the number of transmission opportunities available to the user over said given period of time is at least partly dependent on backhaul delay between access points in the backhaul network of the wireless communication network.

3. The method of claim 2, wherein said step of selecting which one of said at least two different sets of access points to use for COMP uplink reception is based on evaluating uplink quality in relation to the number of transmission opportunities available to the user over said given period of time taking into account the backhaul delay between access points in the backhaul network.

4. The method of claim 3, wherein said step of selecting which one of said at least two different sets of access points to use for COMP uplink reception is based on considering a difference in uplink quality between said at least two different sets of access points in relation to a corresponding difference in number of transmission opportunities over said given period of time due to a difference in backhaul delay.

5. The method of claim 1, wherein said step of selecting which one of said at least two different sets of access points to use for COMP uplink reception comprises the step of processing said uplink quality measure in relation to at least one configurable threshold.

6. The method of claim 5, wherein said at least one configurable threshold is dependent on said measure representative of the number of transmission opportunities available to the user for the considered set of access points over said given period of time taking into account backhaul delay from the access points to the entity responsible for uplink decoding.

7. The method of claim 5, wherein said step of selecting which one of said at least two different sets of access points to use for COMP uplink reception comprises:

identifying the largest number of access points where an uplink quality measure gain obtained from adding an extra access point is above a first threshold; and at least one of:
    selecting the set of access points that provides the best uplink quality measure among the set(s) that has/have a size corresponding to the identified largest number of access points; and
    selecting the smallest set of access points that gives an uplink quality measure above a second threshold.

8. The method of claim 5, wherein said at least one configurable threshold is dependent on the type of session of the user.

9. The method of claim 8, wherein said at least one configurable threshold is dependent on at least one of:
    estimated time the user will be active in a session;
    amount of data the user will transmit in the uplink in a session;
    estimated spectral efficiency in a session; and
    estimated uplink bitrate in a session.

10. The method of claim 1, wherein said step of selecting which one of said at least two different sets of access points to use for COMP uplink reception comprises, for each one of said at least two different sets of access points:

estimating a measure representative of user performance at least partly based on the uplink quality measure of the set of access points and the measure representative of the number of transmission opportunities available to the user for the set of access points over said given period of time; and wherein selecting which one of said at least two different sets of access points to use for COMP uplink reception is further based on the estimated measures representative of user performance.

11. A device on the network side of a wireless communication network, said device being configured to select, for a user, access points for coordinated multipoint (COMP) uplink reception, wherein said device comprises:

a measurement result obtainer configured to obtain, for each of a number of candidate access points, at least one uplink measurement result;

a combiner configured to combine candidate access points to form at least two different sets of access points from said candidate access points;

an estimator configured to estimate, for each one of said at least two different sets of access points, an uplink quality measure based on the uplink measurement results of the one of said at least two different sets of access points;

a determiner configured to determine, for each one of said at least two different sets of access points, a measure representative of the number of transmission opportunities available to the user for the one of said at least two different sets set of access points over a given period of time, said measure representative of the number of transmission opportunities being at least partly dependent on a data retransmission operating mode used in at least one uplink of the one of said at least two different sets of access points; and an access point selector configured to select which one of said at least two different sets of access points to use for COMP uplink reception based on said uplink quality measure and said measure representative of the number of transmission opportunities available to the user over said given period of time.

12. The device of claim 11, wherein said determiner is configured to determine said measure representative of the number of transmission opportunities available to the user over said given period of time at least partly in dependence on backhaul delay between access points in the backhaul network of the wireless communication network.

13. The device of claim 11, wherein the device is comprised in at least a portion of a network node in a wireless communication network.

14. A non-transitory computer-readable medium comprising one or more computer programs for performing, when run on a processor of a network node of a wireless communication network, a method for selecting, for a user, access points for coordinated multipoint (COMP) uplink reception, wherein said method comprises the steps of:

obtaining, for each of a number of candidate access points, at least one uplink measurement result;

combining candidate access points to form at least two different sets of access points from said candidate access points;

for each one of said at least two different set of access points:
  estimating an uplink quality measure based on the uplink measurement results of the set of access points;
  determining a measure representative of the number of transmission opportunities available to the user for the set of access points over a given period of time, said measure representative of the number of transmission opportunities being at least partly dependent on a data retransmission operating mode used in at least one uplink of the set of access points; and
selecting which one of said at least two different sets of access points to use for COMP uplink reception based on said uplink quality measure and said measure representative of the number of transmission opportunities available to the user over said given period of time.

* * * * *